United States Patent
Sano et al.

(10) Patent No.: US 7,996,965 B2
(45) Date of Patent: Aug. 16, 2011

(54) SHEET OR FILM CLIPPING STRETCHER

(75) Inventors: Takayoshi Sano, Fuji (JP); Satoru Nitta, Numazu (JP); Hiromu Saijyo, Sunto-gun (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 161 days.

(21) Appl. No.: 12/374,260

(22) PCT Filed: Jul. 17, 2007

(86) PCT No.: PCT/JP2007/064066
§ 371 (c)(1),
(2), (4) Date: Apr. 6, 2009

(87) PCT Pub. No.: WO2008/010479
PCT Pub. Date: Jan. 24, 2008

(65) Prior Publication Data
US 2009/0199374 A1    Aug. 13, 2009

(30) Foreign Application Priority Data

Jul. 19, 2006 (JP) ................. 2006-196857

(51) Int. Cl.
*D06C 3/04* (2006.01)
(52) U.S. Cl. ............................. 26/73; 26/93
(58) Field of Classification Search ............. 26/73, 93, 26/72, 71, 89, 94, 96, 91; 264/290.2, 288.4; 198/812; 425/66
See application file for complete search history.

(56) References Cited

U.S. PATENT DOCUMENTS

| 2,923,966 | A | * | 2/1960 | Tooke, Jr. et al. | 26/73 |
|---|---|---|---|---|---|
| 3,256,558 | A |   | 6/1966 | Anderson et al. | |
| 3,276,071 | A | * | 10/1966 | Nagae et al. | 26/73 |
| 3,491,402 | A | * | 1/1970 | Koyama et al. | 26/73 |
| 3,611,479 | A |   | 10/1971 | Wicksall | |
| 3,780,421 | A |   | 12/1973 | White, Jr. et al. | |
| 3,890,421 | A |   | 6/1975 | Habozit | |
| 3,916,491 | A |   | 11/1975 | Kampf | |
| 4,055,697 | A |   | 10/1977 | Schmanski | |
| 4,330,499 | A |   | 5/1982 | Aufsess et al. | |
| 4,614,011 | A |   | 9/1986 | Nicholas et al. | |
| 4,637,103 | A | * | 1/1987 | Hutzenlaub | 26/73 |
| 4,807,336 | A |   | 2/1989 | Yoshimura et al. | |
| 4,890,365 | A | * | 1/1990 | Langer | 26/73 |
| 5,161,674 | A | * | 11/1992 | Rutz et al. | 198/812 |

(Continued)

FOREIGN PATENT DOCUMENTS

DE    22 38 357 C3    6/1981

(Continued)

OTHER PUBLICATIONS

Taiwanese Office Action issued in Application No. 96126405 mailed Dec. 3, 2008.

(Continued)

*Primary Examiner* — Amy B Vanatta
(74) *Attorney, Agent, or Firm* — DLA Piper LLP US (57) ABSTRACT

A clip 20 is provided on a clip support member 30, and one end of a main link member 53 and one end of a sub-link member 54 are pivotally connected to a first shaft member 51 at the clip 20 side of the clip support member 30 to constitute a reference linkage at the clip 20 side.

4 Claims, 13 Drawing Sheets

U.S. PATENT DOCUMENTS

| | | | |
|---|---|---|---|
| 5,265,313 A | 11/1993 | Rutz | |
| 5,394,595 A | 3/1995 | Rutz | |
| 5,402,556 A * | 4/1995 | Rutz | 26/73 |
| 5,970,589 A * | 10/1999 | Hayashi et al. | 26/73 |
| 6,746,633 B2 | 6/2004 | Sakamaki et al. | |
| 2004/0052937 A1 | 3/2004 | Ito et al. | |
| 2006/0078754 A1 | 4/2006 | Murakami et al. | |
| 2006/0082022 A1 | 4/2006 | Denker et al. | |
| 2006/0115610 A1 | 6/2006 | Nagashima | |
| 2007/0281112 A1 | 12/2007 | Shi et al. | |
| 2009/0176037 A1 | 7/2009 | Otoshi et al. | |
| 2010/0013121 A1 | 1/2010 | Hashimoto et al. | |
| 2010/0113653 A1 | 5/2010 | Ueda | |

FOREIGN PATENT DOCUMENTS

| | | |
|---|---|---|
| JP | 44-7155 | 3/1969 |
| JP | 59-049939 | 3/1984 |
| JP | 59-067017 | 4/1984 |
| JP | 61-058723 | 3/1986 |
| JP | 63-042839 | 2/1988 |
| JP | 64-53177 | 3/1989 |
| JP | 2-113920 | 2/1990 |
| JP | 04-128028 | 4/1992 |
| JP | 2000-009912 | 1/2000 |
| JP | 2002-022944 | 1/2002 |
| JP | 2002-086554 | 3/2002 |
| JP | 2003-103626 | 4/2003 |
| JP | 2003-236927 | 8/2003 |
| JP | 2004-009542 | 1/2004 |
| JP | 2004-122640 | 4/2004 |
| JP | 2004-195712 | 7/2004 |
| JP | 2004-325561 | 11/2004 |
| JP | 2005-035131 | 2/2005 |
| JP | 2006-159775 | 6/2006 |
| JP | 2006-205409 | 8/2006 |
| JP | 2008-044339 | 2/2008 |
| TW | 550163 | 9/2003 |
| WO | WO 2006-129685 | 12/2006 |
| WO | WO 2007/034972 | 3/2007 |
| WO | WO 2008/038616 | 4/2008 |

OTHER PUBLICATIONS

English Abstract of Taiwanese Office Action issued in Application No. 96126405 mailed Dec. 3, 2008.
English abstract of JP-64-053177.
English abstract of JP-2003-103626.
English language translation of JP-2003-103626.
German Office Action issued in DE Appl 11 2007 001 696.5-16 on Jun. 4, 2010.
English Translation of German Office Action issued in DE Appl 11 2007 001 696.5-16 on Jun. 4, 2010.
German Office Action issued in DE Appl 11 2007 001 690.6-16 on Jun. 4, 2010.
English Translation of German Office Action issued in DE Appl 11 2007 001 690.6-16 on Jun. 4, 2010.
Taiwan Office Action issued in TW 96126407 on Jul. 13, 2010.
English Translation of Taiwan Office Action issued in TW 96126407 on Jul. 13, 2010.
Korean Office Action issued in KR Appl 10 2009 7001033 published on Jul. 20, 2010.
English Translation of Korean Office Action issued in KR Appl 10 2009 7001033 published on Jul. 20, 2010.
English Abstract of JP 2000 009912 published Jan. 14, 2000.
English Translation of JP 2000-009912 published Jan. 14, 2000.
English Abstract of JP 2006-159775 published Jun. 22, 2006.
English Translation of JP 2006-159775 published Jun. 22, 2006.
English Abstract of TW 550163 published Sep. 1, 2003.
English Abstract of JP 2004-195712 published Jul. 15, 2004.
English Translation of JP 2004-195712 published Jul. 15, 2004.
English Language translation of JP-2004-122640 published Apr. 22, 2004.
Image File Wrapper in U.S. Appl. No. 12/417,751 as of Oct. 12, 2010.
Image File Wrapper in U.S. Appl. No. 12/374,270 as of Oct. 12, 2010.
Image File Wrapper in U.S. Appl. No. 12/524,111 as of Oct. 12, 2010.
Image File Wrapper in U.S. Appl. No. 12/777,693 as of Oct. 12, 2010.
English Abstract of JP 2-113920 published Apr. 26, 1990.
English abstract of JP 2003-236927 published Aug. 26, 2003.
English abstract of JP 2004-122640 published Apr. 22, 2004.
Search Report of International Application No. PCT/JP2008/050507 issued Apr. 8, 2008.
Machine English language translation of JP-2006-205409 published Aug. 10, 2006.
English language Abstract of JP-2006-205409 published Aug. 10, 2006.
English language Abstract of Japanese Patent Post-Examined Publication No. 44-07155 published Mar. 1969.
International Search Report of PCT/JP2007/064066.
English Language translation of JP-2003-236927.
English Language translation of Jp-2004-122640.
English abstract of JP-61-058723.
English abstract of JP-59-049939.
English abstract of JP-59-067017.
International Search Report of PCT/JP2007/064067.
Machine English Language Translation of JP-2002-022944.
Machine English Language Translatibn of JP-2004-009542.
Machine English Language Translation of JP-2005-035131.
Machine English Language Translation of JP-2002-086554.
Machine English Language Translation of JP-2004-325561.
English abstract of JP-2002-022944.
English abstract of JP-2004-009542.
English abstract of JP-2005-035131.
English abstract of JP-2002-086554.
English abstract JP-2004-325561.
Office Action issued in JP 2007-012473 on Oct. 26, 2010.
English Translation of Japanese Office Action issued in JP 2007-012473 on Oct. 26, 2010.
Office Action issued in German Appl 11 2008 000 240.1-16 on Oct. 5, 2010.
English Translation of Office Action issued in German Appl 11 2008 000 240.1-16 on Oct. 5, 2010.
English Abstract of JP 04-128028 published Apr. 28, 1992.
English Abstract of JP 63-042839 published Feb. 24, 1988.
Office Action issued in CN 200780027246.6 on Aug. 12, 2010.
English Translation of Office Action issued in CN 200780027246.6 on Aug. 12, 2010.
Office Action issued in U.S. Appl. No. 12/147,751 on Dec. 6, 2010.
English Abstract of JP 2008-044339 published Feb. 28, 2008.
English Translation of JP 2008-044339 published Feb. 28, 2008.
English Language translation of JP-2002-022944 published Jan. 23, 2002.
Notice of Allowance issued in U.S. Appl. No. 12/777,693 on May 26, 2011.
Office Action issued in U.S. Appl. No. 12/417,751 on Apr. 27, 2011.
Amendment filed in U.S. Appl. No. 12/374,270 on May 24, 2011.
Korean Office Action issued in 10-2009-7015492 on Apr. 15, 2011.
English Language Translation of Korean Office Action issued in 10-2009-7015492 on Apr. 15, 2011.

* cited by examiner

SHEET OR FILM CLIPPING STRETCHER

TECHNICAL FIELD

The present invention relates to a sheet or film clipping stretcher for stretching a thermoplastic resin film or the like, and particularly, to a sheet or film clipping stretcher adapted for a simultaneous biaxial stretch being flow-directional and transverse.

BACKGROUND ART

There are sheet or film clipping stretchers disclosed in patent documents 1 to 3, where they are configured with two isometric linkage units provided with clips adapted to clip a sheet or film, and connected by chain links in an endless manner, and arranged on a plane, at right and left, to be line-symmetric. In those sheet or film clipping stretchers, between right and left clips, the distance is gradually expanded by guide rails to effect a transverse stretch (TD stretch), and concurrently, the isometric linkage units are extended for clip pitches to be gradually increased to thereby effect a flow-directional stretch (MD stretch), thereby permitting a simultaneous biaxial stretch to be implemented.

Patent document 1: Japanese Patent Publication No. 44-7155
Patent document 2: Japanese Patent Application Laid-Open Publication No. 61-58723
Patent document 3: Japanese Patent Application Laid-Open Publication No. 2004-122640

DISCLOSURE OF INVENTION

However, to implement a simultaneous biaxial stretch, those sheet or film clipping stretchers described are problematic, as follows:

(a) In that which has a clip attached to one end of a main link member, at a flexural part of guide rail where the transverse stretch width varies, the clip is subject to large changes in angle to a sheet or film, in addition to large variations in clip position interval (clip MD pitch) in flow direction (MD direction) of the sheet or film. It is thus difficult to implement a high-precision, high-magnification simultaneous biaxial stretch.

(b) In that which has a chain link arranged opposite to a clipping side, a flexural portion of guide rail may have enlarged radii, and flow directional stretching forces may be born by enlarged moments. Further, in that which has a chain link arranged at a clipping side, a back-fold may happen just after stretch, causing troubles in operation.

It is an object of the present invention to solve the problems described allowing for implementation of a high-precision, high-magnification simultaneous biaxial stretch.

According to a principal aspect of the present invention, a sheet or film clipping stretcher includes first and second clip arrays composed of clips, respectively, and configured to clip both side edge parts of a sheet or film to stretch the sheet or film, and comprises first and second clip array circulators line-symmetrically arranged on a plane, and configured to circulate the first and second clip arrays along line-symmetric prescribed routes, respectively, the first and second clip array circulators each respectively comprising a plurality of clip support members rectangular in shape, and each respectively having a clip supported on one longitudinal end part thereof, and a longitudinal elongate hole formed therein at the other end side, a first shaft member provided in a vicinity of the one end part of a respective clip support member, a slider slidably engaged with the elongate hole of the respective clip support member, a second shaft member provided to the slider of the respective clip support, member, a main link member having an end thereof pivotally connected to the first shaft member of the respective clip support member, and another end thereof pivotally connected to a second shaft member of a neighboring clip support member, a sub-link member having an end thereof pivotally connected to the first shaft member of the respective clip support member, and another end thereof pivotally connected by a pivot shaft to an intermediate part of the main link member, a reference rail engaged with an engaging element provided on the first shaft member of the respective clip support member, and defining a prescribed route, a pitch setting rail provided along with the reference rail, engaged with an engaging element provided on the second shaft member of the respective clip support member, and configured to set a pitch between neighboring clip support members in a variable manner depending on a spacing distance relative to the reference rail, and a drive sprocket configured to selectively engage with a driving roller provided on the first shaft member of the respective clip support member to have the respective clip support member travel along the prescribed route.

BEST MODE FOR CARRYING OUT THE INVENTION

There will be described an embodiment of a sheet or film clipping stretcher according to the present invention, with reference to FIG. 1 to FIG. 5.

Figure 1:
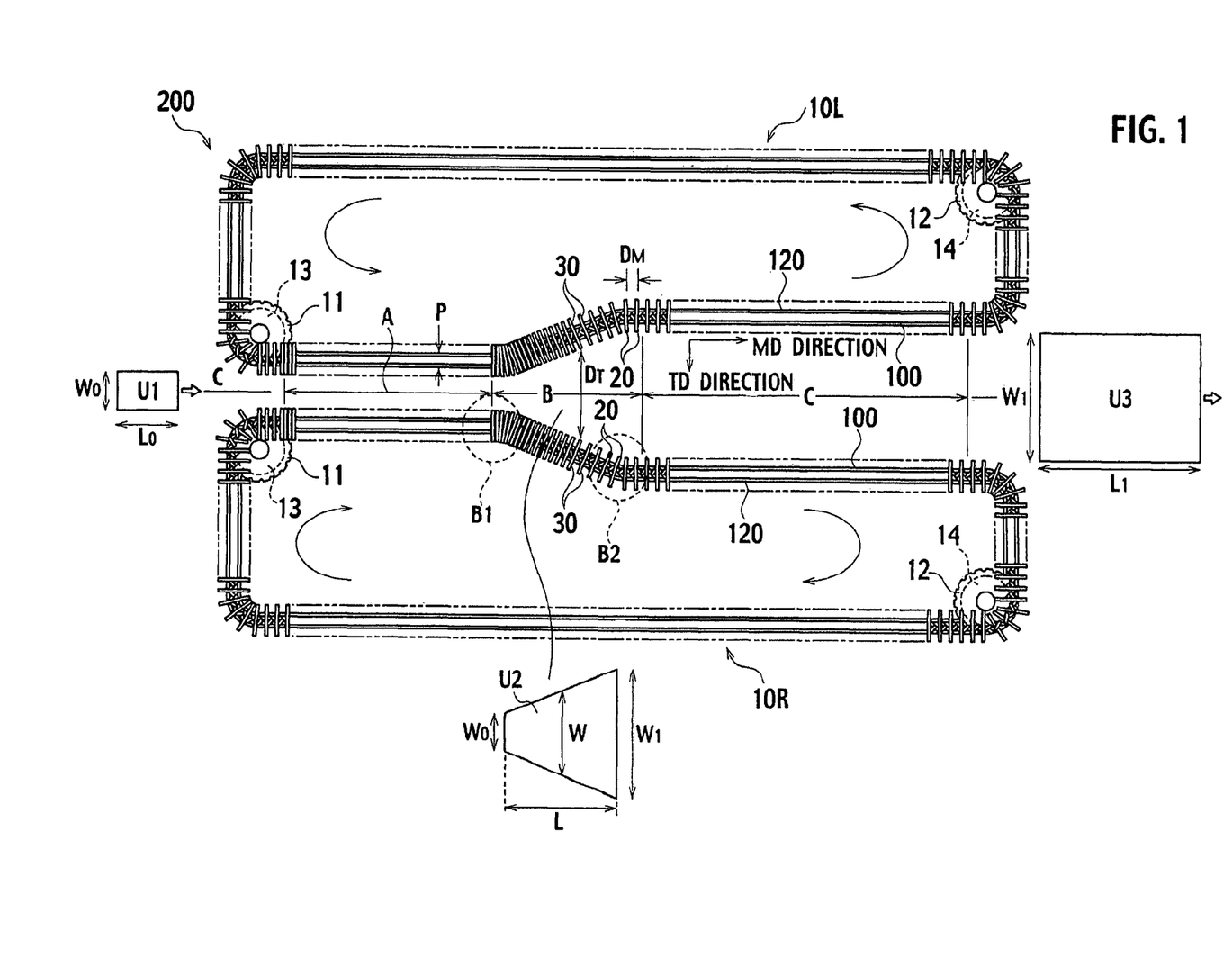
FIG. 1 is a plan view of an entire configuration of a sheet or film clipping stretcher according to an embodiment of the present invention.

Description is now made of an entire configuration of a sheet or film clipping stretcher according to the present embodiment, with reference to FIG. 1.

The sheet or film clipping stretcher 200 includes endless loops 10R and 10L that have multiplicities of clips 20 configured to clip a sheet or film. The endless loops 10R and 10L are arranged to be line-symmetric about a line CL on a plane as illustrated in FIG. 1, which line can be set arbitrarily on the plane. It is noted that in view of an inlet end of sheet or film S (the left end in FIG. 1), that endless loop residing on the right side is referred herein to the endless loop 10R, and that endless loop residing on the left side, to the endless loop 10L.

The endless loops 10R and 10L have their sets of clips 20 guided by reference rails 100 to circulate in a looping manner. As illustrated in FIG. 1, for endless loop 10R, the circulation is clockwise, and for sheet endless loop 10L, the circulation is counterclockwise.

A preheating zone A, a stretching zone B, and a heat-treating zone C are configured in this order from the inlet end of sheet or film S to an outlet end (the right end in FIG. 1).

It is noted that in FIG. 1, designated by a quadrilateral U1 is part of sheet or film S before its transverse stretch (that is, in the preheating zone A). And, quadrilaterals U2 and U3 depict how the quadrilateral U1 is deformed, when passing through the stretching zone B (in flow directional stretch) and the heat-treating zone C (after flow-directional and transverse stretch), respectively.

It is now assumed that the quadrilateral U1 has a transverse (TD) dimension $W_0$ identical to a transverse size of sheet or film S, and the quadrilateral U3 has a transverse (TD) dimension $W_1$ identical to a transverse size of sheet or film S after flow-directional and transverse stretch. Further, the quadrilateral U1 has a flow-directional (MD) dimension $L_0$, which is assumed to develop to $L_1$ after flow-directional and transverse stretch (that is, in the quadrilateral U3). By such settings, it so follows that, as the quadrilateral U1 passes through the stretching zone B, this quadrilateral U1 (that is, the quadrilateral U2) has a transverse dimension W, and a flow-directional dimension L, meeting inequality expressions, such that $W_0 \leq W \leq W_1$, and $L_0 \leq L \leq L_1$, respectively.

There will be describe below stretching sheet or film S under such the assumption, and by applying dimensions of quadrilaterals U1, U2, and U3 to description of flow-directional and transverse sizes of sheet or film S, for easier comprehension.

In the preheating zone A, the endless loops 10R and 10L have a spacing distance $D_T$ corresponding to a transverse width $W_0$ of sheet or film S before transverse stretch, and the endless loops 10R and 10L are arranged in parallel, with the width $W_0$ kept as it is over the entire region.

In the stretching zone B, the endless loops 10R and 10L have a gradually increased spacing distance DT, as they extend from the preheating zone A toward the heat-treating zone C, while the endless loops 10R and 10L are subject to a non-parallel arrangement. For the endless loops 10R and 10L in the stretching zone B, the spacing distance DT is varied, becoming correspondent to the transverse width $W_0$ of sheet or film S before transverse stretch at a stretch initiating end (as a connected end to the preheating zone A), and correspondent to a transverse width $W_1$ of sheet or film S stretched transversely finally at a stretch completing end (as a connected end to the heat-treating zone C).

In the heat-treating zone C, the endless loops 10R and 10L have a spacing distance corresponding to the transverse width $W_1$ of sheet or film S stretched transversely finally, and the endless loops 10R and 10L are arranged in parallel, with the width $W_1$ kept as it is over the entire region.

Description is now made of details of configuration of the sheet or film clipping stretcher 200 according to the present embodiment, with reference to FIG. 2 to FIG. 5.

The right and left endless loops 10R and 10L each have a number of clips 20, of which a respective one is mounted on one longitudinal end part (at the front) of a clip support member 30 rectangular in shape. The clip 20 is configured for a clipping of sheet or film S in a releasably gripping manner, with a yoke-shaped clip body 21, a stationary lower clip member 22 fixedly attached to the clip body 21, a movable lever 24 rotatably attached to the clip body 21 by a pin 23, and a movable upper clip member 26 swingably attached to a lower end, of the movable lever 24 by a pin 25. And, the clip 20 is adapted to clip a side edge of sheet or film S in a pinching manner by combination of the stationary lower clip member 22 and the movable upper clip member 26.

For the number of clips 20, there is a set of clip support members 30 identical in number thereto, of which a respective one is adapted to individually support a clip 20. The clip support member 30 is configured as a rigid frame structure enclosed in a section (refer to FIG. 4 and FIG. 5) with a front wall 37, a rear wall 38, an upper beam 35, and a lower beam 36. At both ends (the front wall 37 and the rear wall 38) of the clip support member 30, there are travel wheels 33 and 34 rotatably supported by axles 31 and 32, respectively. The travel wheels 33 and 34 are adapted to roll on horizontal travel roadbeds 111 and 112 formed on a base 110. The travel roadbeds 111 and 112 are parallel to a reference rail 100, along the length.

At far end sides (read sides) of the upper beam 35 and the lower beam 36 of each clip support member 30, there are longitudinal elongate holes (as elongate bores) 39 formed therein. The upper and lower elongate holes 39 have sliders 40 respectively engaged therewith and slidable in longitudinal directions of the elongate holes 39.

In a vicinity of one end part (on the clip 20 side) of each clip support member 30, there is a single first shaft member 51 vertically provided through the upper beam 35 and the lower beam 36. The upper and lower sliders 40 of each clip support member 30 have a single second shaft member 52 vertically provided therethrough.

To the first shaft member 51 of each clip support member 30, one end of a main link member 53 is pivotally connected. The other end of the main link member 53 is pivotally connected to the second shaft member 52 of a neighboring clip support member 30.

To the first shaft member 51 of each clip support member 30, one end of a sub-link member 54 is pivotally connected, in addition to the main link member 53. The sub-link member 54 is pivotally connected at the other end to an intermediate part of the main link member 53, by a pivot shaft 55.

Figure 2:
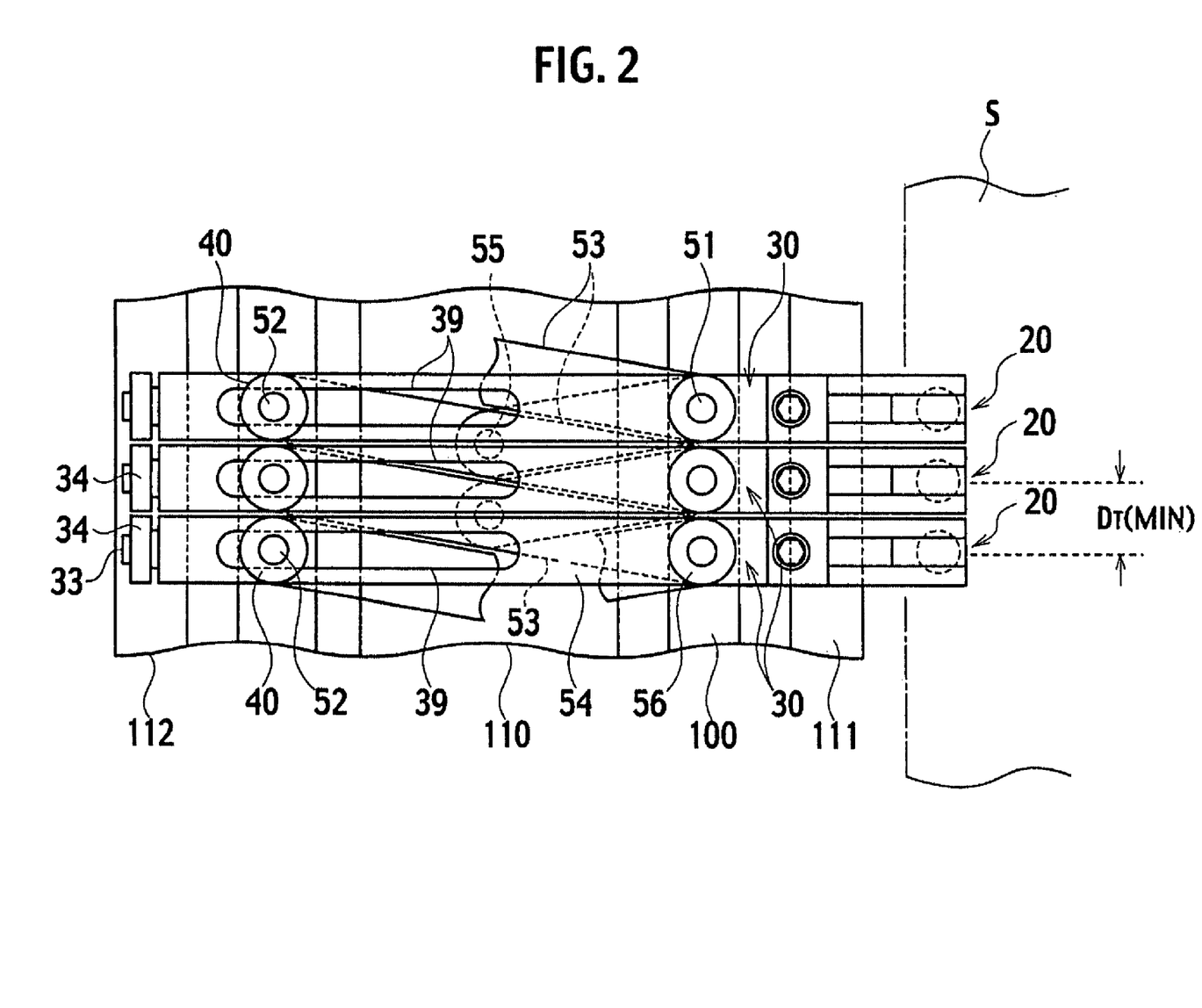
FIG. 2 is a plan view of essential parts of the sheet or film clipping stretcher in a minimal pitch state according to the embodiment.
Figure 3:
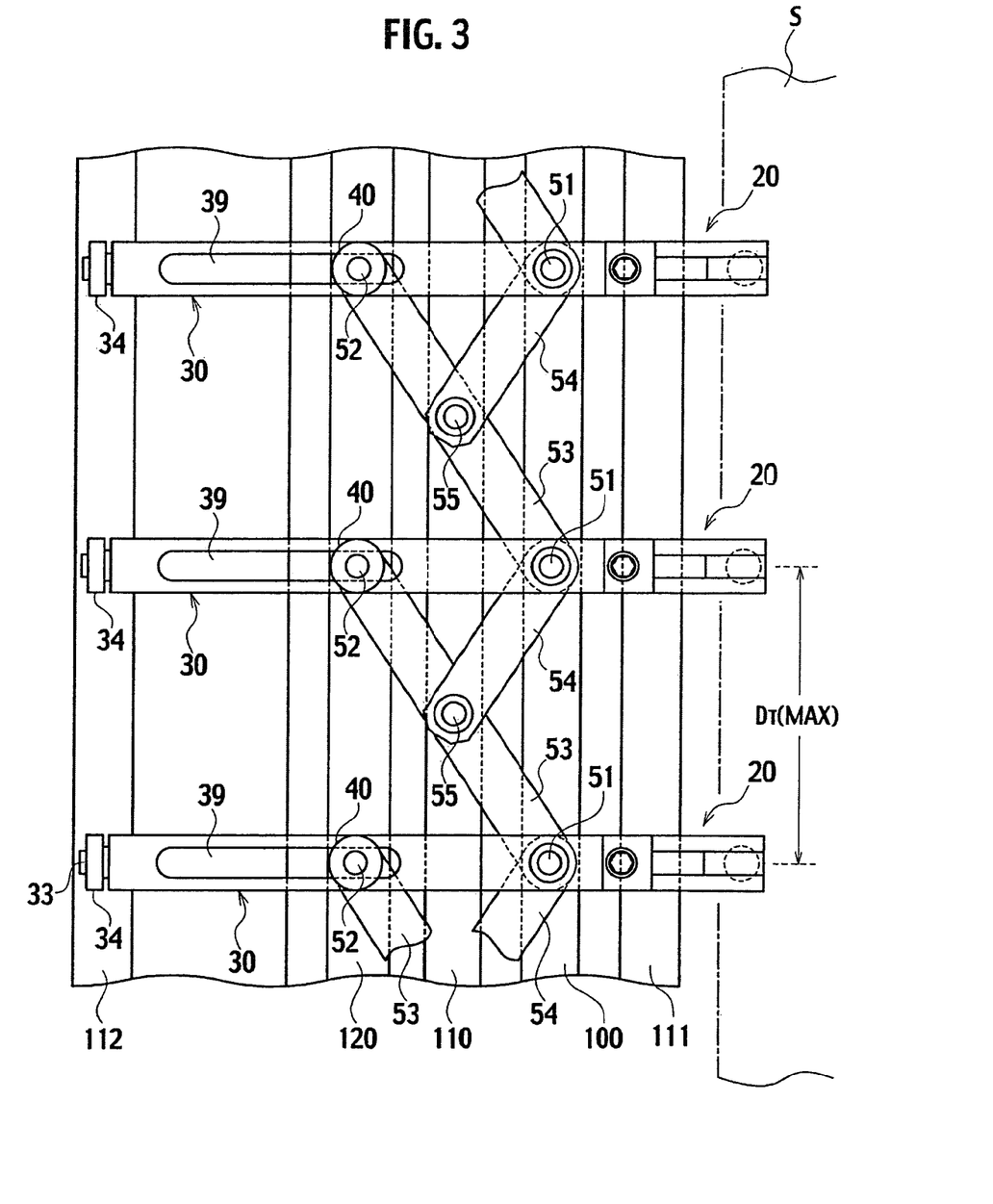
FIG. 3 is a plan view of essential parts of the sheet or film clipping stretcher in a maximal pitch state according to the embodiment.

Main link members 53 and sub-link members 54 constitute linkages, whereby as illustrated in FIG. 2, the farther their sliders 40 go toward the far ends of clip support members 30 (opposite to the clips) the smaller those pitches (clip MD pitches) $D_M$ that neighboring clip support members 30 have therebetween become, and as illustrated in FIG. 3, the more their sliders 40 come up toward the one ends of clip support members 30 (toward the clips) the greater those pitches $D_M$ that neighboring clip support members 30 have therebetween become.

It is noted that in the present embodiment, neighboring clip support members 30 have a minimal pitch $D_M$ (MIN) therebetween established by the neighboring clip support members 30 contacting each other, as illustrated in FIG. 2, and neighboring clip support members 30 have a maximal pitch $D_M$ (MAX) therebetween established by sliders 40 arriving at stroke end parts at the one end sides (the clip sides) of the clip support members 30.

The first shaft member 51 has guide rollers (as engaging elements) 56 rotatably provided on a lower end thereof. The guide rollers 56 are engaged with a recessed channel 101 of the reference rail 100 provided on the base 110 to define a circulation route of clips 20. The first shaft member 51 has a driving roller 58 rotatably provided on an upper end thereof.

The driving roller 58 is configured to engage with drive sprockets 11 and 12 (refer to FIG. 1) in a selective manner to have a respective clip support member 30 travel along the circulation route. In other words, the drive sprockets 11 and 12 are adapted to selectively engage with the driving roller 58 of a respective clip support member 30, and are driven to rotate by electric motors 13 and 14 (refer to FIG. 1) to provide each clip support member 30 with forces to have the clip support member 30 travel along the circulation route.

The second shaft member 52 has pitch setting rollers (as engaging elements) 57 rotatably provided on a lower end thereof. The pitch setting rollers 57 are engaged with a recessed channel 121 of a pitch setting rail 120 provided on the base 110, along with the reference rail 100, for the sliders 40 to be set in position in the elongate holes 39.

The pitch setting rail 120 works for sliders 40 to be set in position in elongate holes 39 depending on a spacing distance P thereof relative to the reference rail 100, to thereby set pitches $D_M$ between neighboring clip support members 30 in a variable manner. By the pitch setting rail 120, the longer the spacing distance P relative to the reference rail 100 becomes (that is, the farther it is spaced off the reference rail 100) the farther sliders 40 are forced to go toward the far ends of clip support members 30 (opposite to the clips), rendering the smaller pitches $D_M$ between neighboring clip support members 30, and the shorter the spacing distance P relative to the reference rail 100 becomes (that is, the nearer it comes up to the reference rail 100) the more sliders 40 are forced to come up toward the one ends of clip support members 30 (toward the clips), rendering the greater pitches $D_M$ between neighboring clip support members 30.

Figure 4:
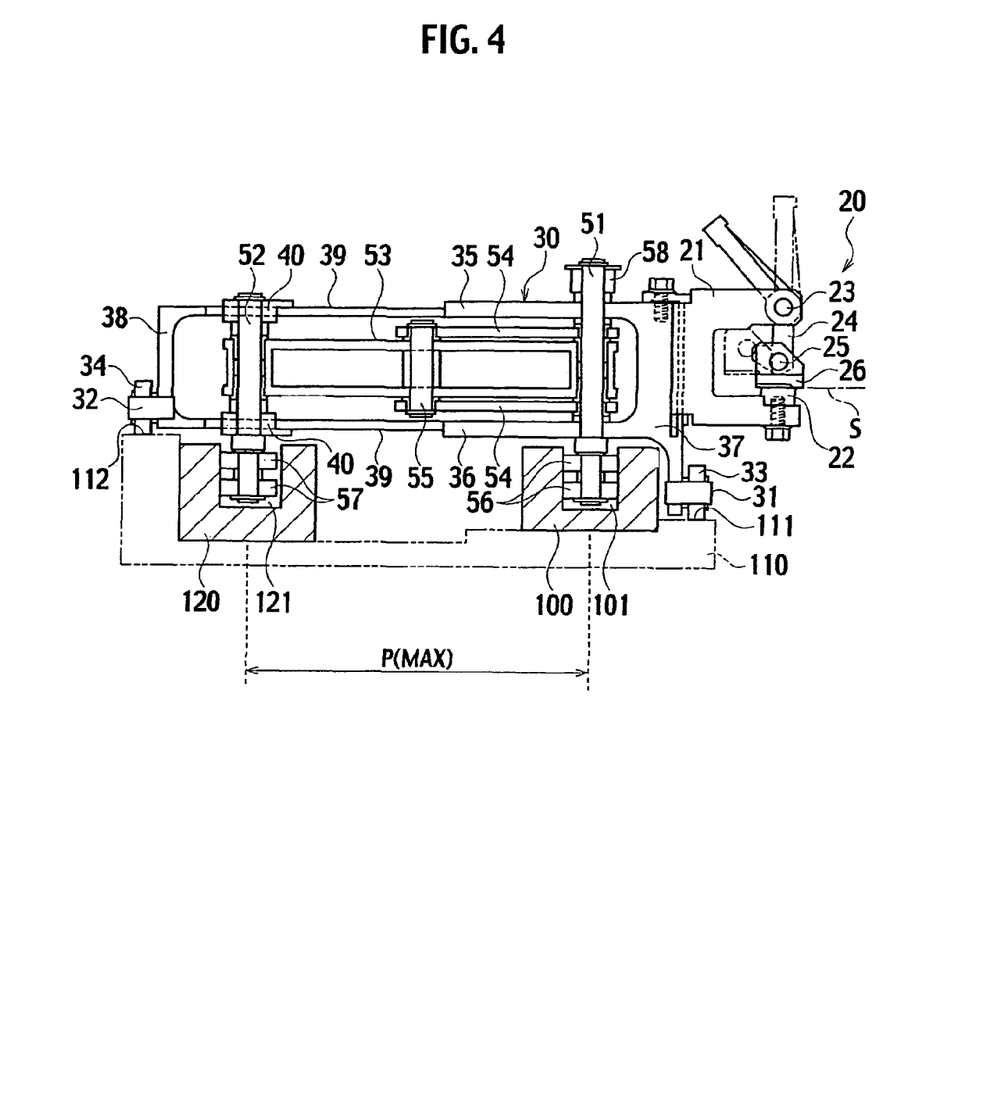
FIG. 4 is a side view of essential parts of the sheet or film clipping stretcher in the minimal pitch state according to the embodiment.
Figure 5:
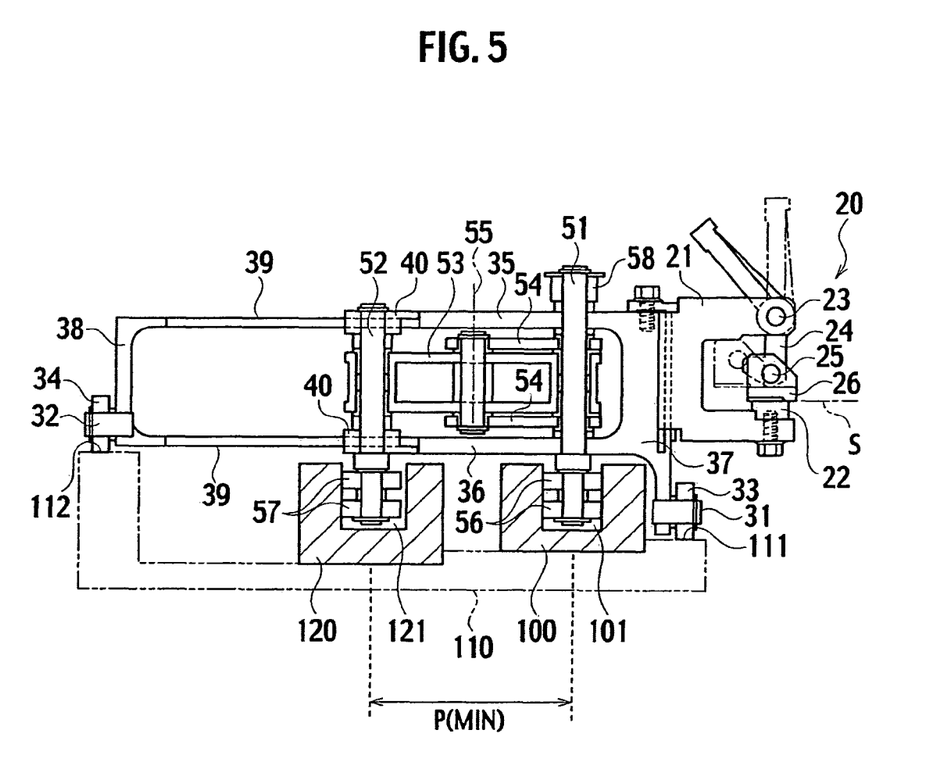
FIG. 5 is a side view of essential parts of the sheet or film clipping stretcher in the maximal pitch state according to the embodiment.

Description is now made of the pitch setting rail 120, with reference to FIG. 4 and FIG. 5. In the preheating zone A, as illustrated in FIG. 4, the spacing distance P between pitch setting rail 120 and reference rail 100 is set to a maximal value (P (MAX)) over the entire region. In this situation, between neighboring clip support members 30, the pitch $D_M$ is set to a minimal value $D_M$ (MIN).

In the stretching zone B, the spacing distance P between pitch setting rail 120 and reference rail 100 gradually becomes shorter, as they extend from the stretch initiating end (as the connected end to the preheating zone A), where it has the maximal value (P (MAX)), to the stretch completing end, where it has a minimal value P (MIN).

In the heat-treating zone C, as illustrated in FIG. 5, the spacing distance P between pitch setting rail 120 and reference rail 100 is set to the minimal value (P (MIN)) over the entire region. In this situation, between neighboring clip support members 30, the pitch $D_M$ is set to a maximal value $D_M$ (MAX).

Description is now made of functions of the sheet or film clipping stretcher 200 according to the present embodiment.

For the right endless loop 10R, the drive sprockets 11 and 12 are driven to rotate clockwise by the electric motors 13 and 14, and for the left endless loop 10R, the drive sprockets 11 and 12 are driven to rotate counterclockwise by the electric motors 13 and 14. And, those clip support members 30 of which driving rollers 58 are engaged with the drive sprockets 11 and 12 are given forces to travel. The endless loop 10R is thereby forced to go round clockwise, and the endless loop 10L, to go round counterclockwise, whereby sheet or film S is taken in between; the endless loops 10R and 10L at the left end in FIG. 1.

At an opening for sheet or film S to be taken in, both side edges of sheet or film are clipped (clip on) by clips 20 of the endless loops 10R and 10L, and the sheet or film S first enters the preheating zone A, as the endless loops 10R and 10L move, that is, as clip support members 30 are guided to travel by reference rails 100.

In the preheating zone A, the spacing distance DT between endless loops 10R and 10L is kept as it is correspondent to a transverse width $W_0$ before transverse stretch, the endless loops 10R and 10L being arranged parallel to each other over the entire region. And, the spacing distance P between pitch setting rail 120 and reference rail 100 is set to a maximal value P (MAX) uniformly over the entire region. Accordingly, in the preheating zone A, simply a preheating is performed, and neither flow-directional stretch nor transverse stretch of sheet or film S is performed.

Next, the sheet or film S enters the stretching zone B. In the stretching zone B, the endless loops 10R and 10L have a gradually increasing spacing distance $D_T$, as they move from the preheating zone A toward the heat-treating zone C. Further, the spacing distance P between pitch setting rail 120 and reference rail 100 becomes gradually shorter (P (MAX)→P (MIN)), as they extend from the preheating zone A toward the heat-treating zone C. Accordingly, sliders 40 are displaced toward the one ends (toward clips) of clip support members 30, having gradually increased pitches $D_M$ between neighboring clip support members 30. By that, in the stretching zone B, both flow-directional stretch and transverse stretch of sheet or film S are performed simultaneously.

After that, the sheet or film S enters the heat-treating zone C. In the heat-treating zone C, the spacing distance $D_T$ between endless loops 10R and 10L is kept as it is corespondent to a transverse width $W_1$ after transverse stretch, the endless loops 10R and 10L being arranged parallel to each other over the entire region. And, the spacing distance P between pitch setting rail 120 and reference rail 100 is set to a minimal value P (MIN) uniformly over the entire region. Accordingly, in the heat-treating zone C, simply a heat treatment such as temperature control is performed, and neither flow-directional stretch nor transverse stretch of sheet or film S is performed.

At an outlet of the heat-treating zone C, the sheet or film is released (clip off) from the clipping by clips 20 of the endless loops 10R and 10L, and the sheet or film goes straight ahead, while clip support members 30 are guided by reference rails 30 to circulate in a looping manner.

According to the present embodiment, in a sheet or film clipping stretcher 200, a clip 20 is mounted on a clip support member 30, and one end of a main link member 53 and one end of a sub-link member 54 are pivotally connected to a first shaft member 51 at the clip 20 side of the clip support member 30, whereby a reference linkage is configured on the clip 20 side, with a structure needing no chain links.

Accordingly, unlike conventional techniques having a clip mounted on one end of a main link member, it is implemented to prevent variations of angles of clips to sheet or film S, and variations of positional intervals $D_M$ (as MD pitches of clips) in the longitudinal direction (as MD direction) of sheet or film S, from getting large at flexural portions (designated by B1 and B2 in FIG. 1) of guide rails (as reference rails 100) where the width of transverse stretch changes, thus allowing for simultaneous biaxial stretch of high magnification to be performed with high precision.

Further, the provision of a reference linkage configured on the clip side serves, among others, to keep radii of flexural portions B1 and B2 of reference rails 100 from getting large, and prevent moments to be born to provide forces to stretch sheet or film S in the flow direction (MD direction) from getting large.

In addition, omission of chain links permits the number of components to be reduced, and eliminates occurrences of a back-fold just after stretch that might have caused troubles in operation.

There will be described another embodiment of the sheet or film clipping stretcher according to the present invention, with reference to FIG. 6 to FIG. 9. It is noted that those parts corresponding to FIG. 2 to FIG. 5 are designated by like reference characters to FIG. 2 to FIG. 5, eliminating redundant description.

Figure 6:
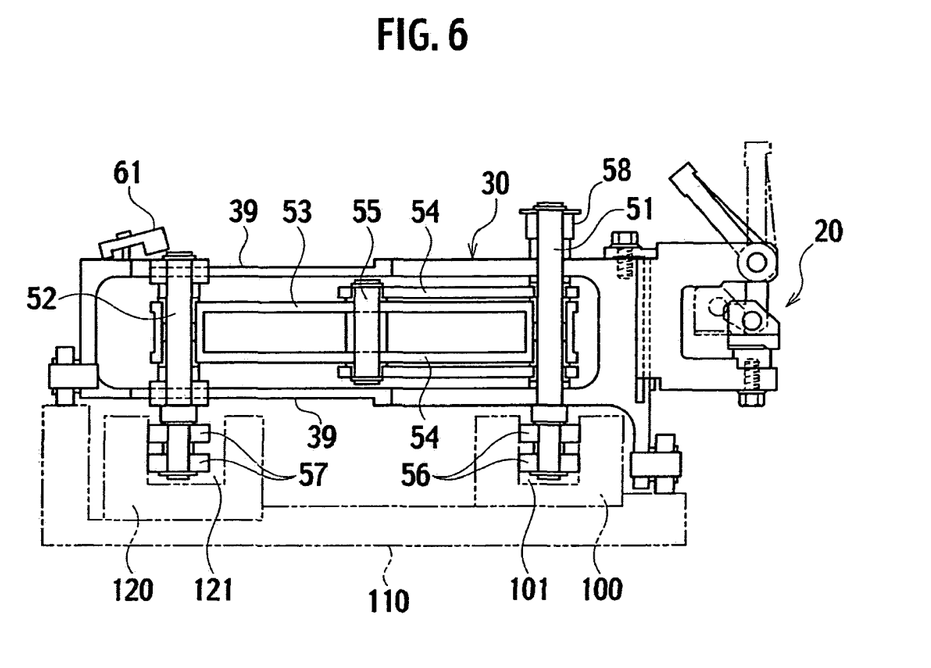
FIG. 6 is a side view of essential parts of a sheet or film clipping stretcher in a minimal pitch state (with stoppers off) according to another embodiment of the present invention.

In this embodiment, as illustrated in FIG. 6, each clip support member 30 includes a stopper member 61 configured for a variable setting of slidable range of a slider 40 in an elongate hole 39 of the clip support member 30. The stopper member 61 is movable between an abutment position illustrated in FIG. 8, where it is put in a stroke end part at the far end side of the elongate hole 39 (as opposite side to a clip) for the slider 40 to be brought into abutment therewith, and a retract position illustrated in FIG. 6, where it is retracted from the abutment position and free of abutments with the slider 40.

Figure 7:
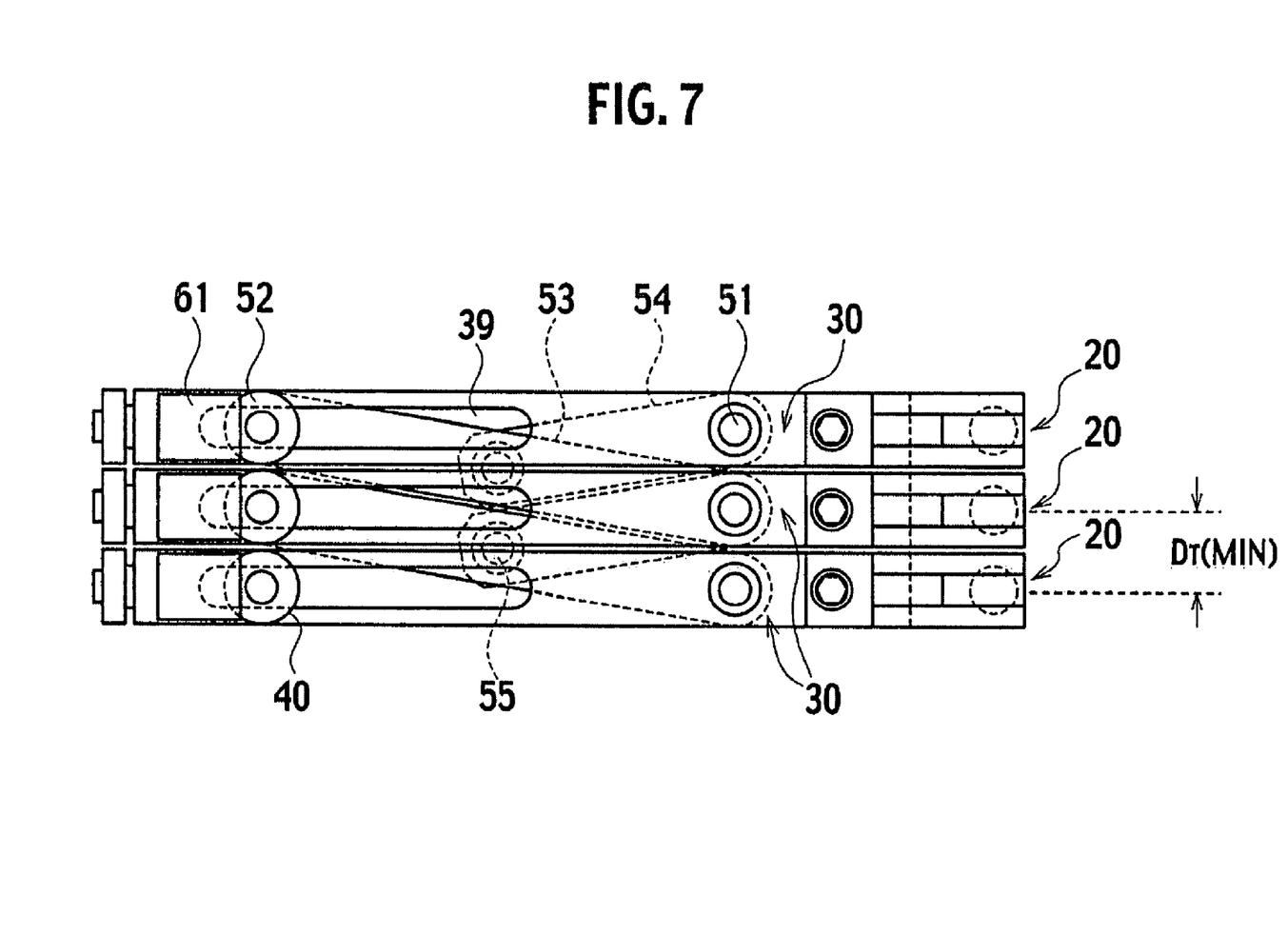
FIG. 7 is a plan view of essential parts of the sheet or film clipping stretcher in the minimal pitch state (with stoppers off) according to the other embodiment of the present invention.

As illustrated in FIG. 7, under a condition in which stopper members 61 are put in retract positions and free of abutments with sliders 40, neighboring clip support members 30 have a minimal pitch therebetween established by the neighboring clip support members 30 contacting each other, like the embodiment described. That is, this case has a minimal pitch $D_M$(MIN) (refer to FIG. 7).

Figure 8:
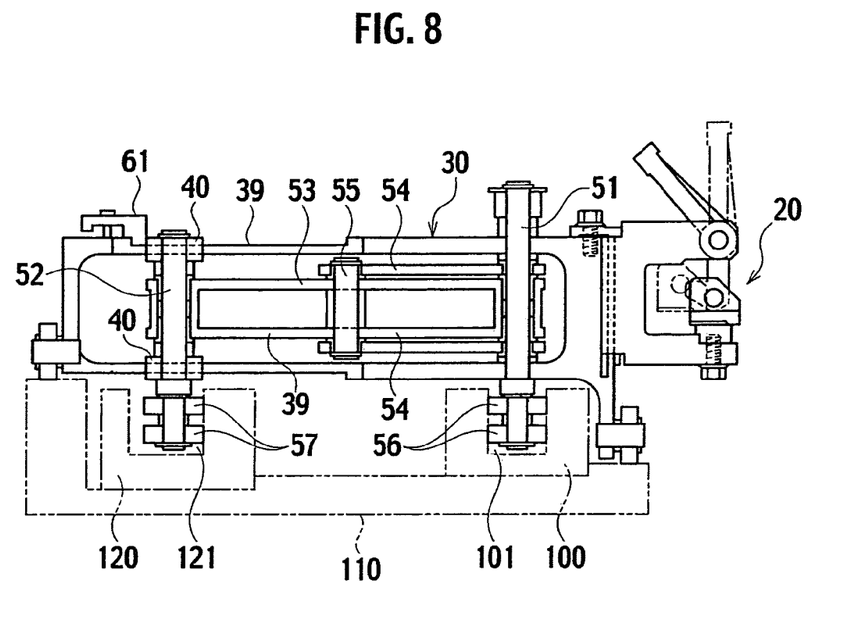
FIG. 8 is a side view of essential parts of the sheet or film clipping stretcher in a minimal pitch state (with stoppers on) according to the other embodiment of the present invention.
Figure 9:
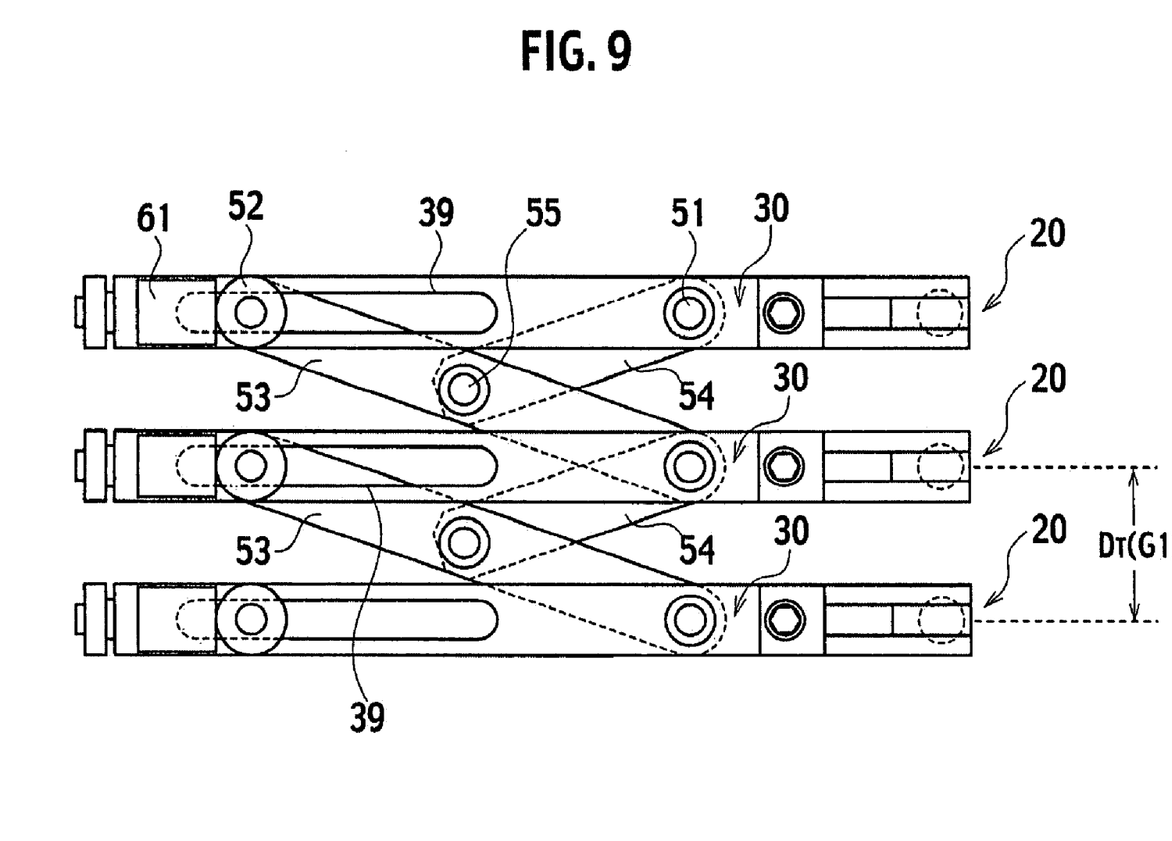
FIG. 9 is a plan view of essential parts of the sheet or film clipping stretcher in the minimal pitch state (with stoppers on) according to the other embodiment of the present invention.

On the other hand, as illustrated in FIG. 8, under a condition in which stopper members 61 are put in abutment positions for sliders 40 to be brought into abutments therewith, neighboring clip support members 30 have minimal pitches therebetween depending on positions of the sliders 40 in elongate holes 39 at the opposite sides to clips, to be individually established by a stopper member 61 for each clip support member 30. This enables, as illustrated in FIG. 9, a prescribed pitch $D_M$(G1) to be set between non-contacting neighboring clip support members 30.

This permits compensation for variations of clip MD pitches in the longitudinal direction (as MD direction) of sheet or film S due to bending or rattling of, among others, main links 53, sub-links 54, or their pivots, or precisions in positioning of guide rails (reference rails 100, pitch setting rails 120), thus allowing for clip MD pitches DM in clipping of sheet or film to be set evenly, and with high accuracy, to a greater value than the minimal pitch $D_M$ (MIN) between neighboring clip support members 30 contacting each other.

It is noted that changes in position of stopper members 61 between their abutment positions and retract positions, i.e., on and off operations may well be performed manually, and besides, automatically by using cams or the like white clips are traveling. In this case, stopper members 61 may be set in abutment positions when clipping sheet or film S, and the stopper members 61 may be moved to retract positions after sheet or film is clipped, to thereby effect a negative stretch (contraction) in the longitudinal direction (as MD direction) of sheet or film S.

Further, abutment positions of stopper members 61 may be set by adjustments of bolt fastening position, individually on each clip support member 30, to have minimal values of clip MD pitch individually determined for each clip support member 30, thereby permitting compensation for variations of clip MD pitches in MD direction due to bending or rattling of, among others, main links 53, sub-links 54, or their pivots, or precisions in positioning of guide rails (reference rails 100, pitch setting rails 120), thus allowing for minimal values of clip MD pitch $D_M$ to be set evenly, and with high accuracy, to a greater value than the minimal pitch $D_M$(MIN) between neighboring clip support members 30 contacting each other.

It is noted that for provision, of the stopper member 61, a recessed channel 121 of a pitch setting rail 120 has a channel width set, as illustrated, greater than an outside diameter dimension of pitch setting rollers 57, in consideration of an allowance for stopper actions.

Further, as illustrated in FIG. 10 to FIG. 13, there may be a stopper member 62 provided in a stroke end part at one end side (clip side) of an elongate hole 39. In this case, a maximal value of clip MD pitch $D_M$ can be set in a variable manner, like the stopper member 61 permitting a variable setting of a minimal value of clip MD pitch $D_M$.

Figure 10:
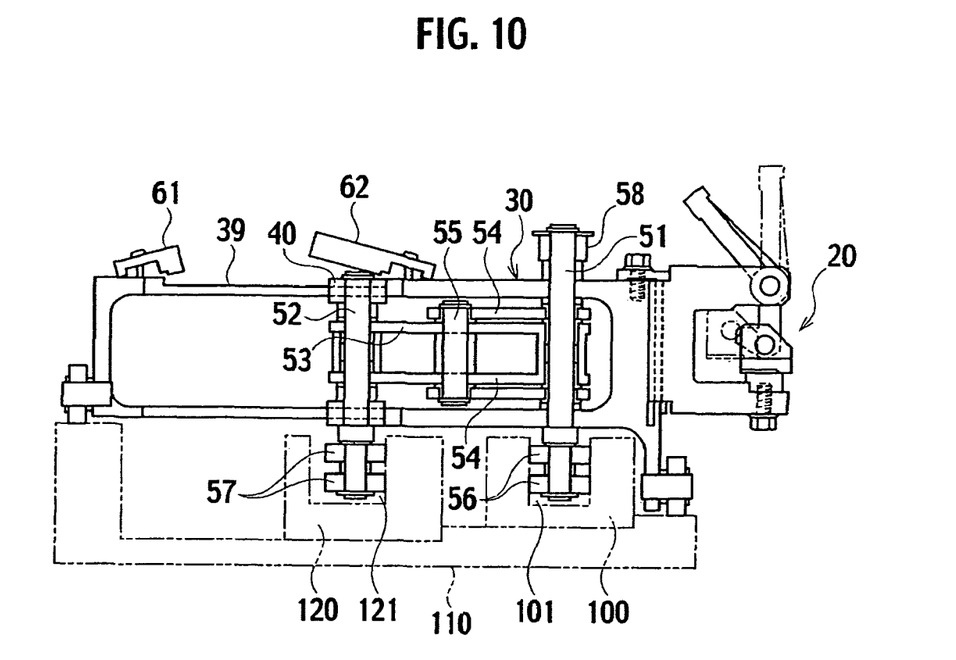
FIG. 10 is a side view of essential parts of a sheet or film clipping stretcher in a maximal pitch state (with stoppers off) according to another embodiment of the present invention.
Figure 11:
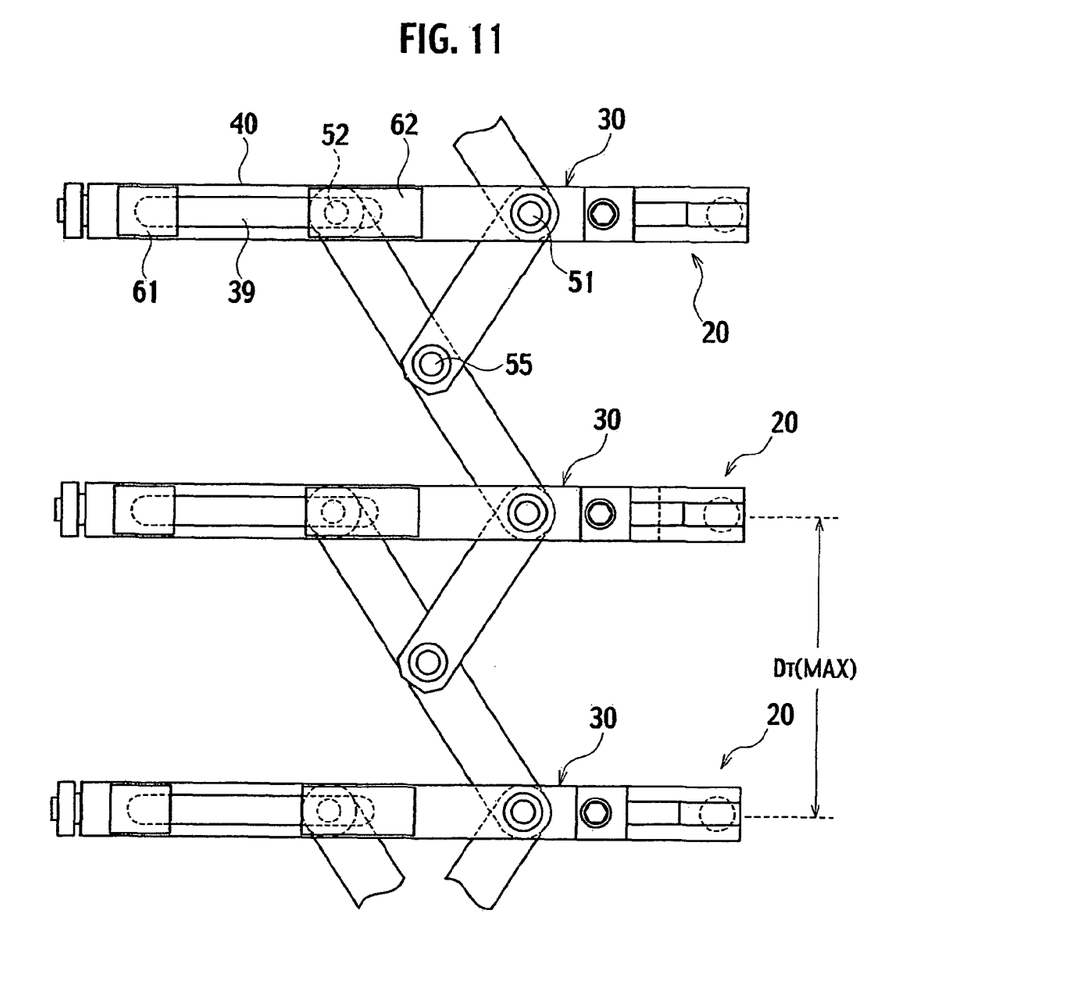
FIG. 11 is a plan view of essential parts of the sheet or film clipping stretcher in the maximal pitch state (with stoppers off) according to the other embodiment of the present invention.
Figure 12:
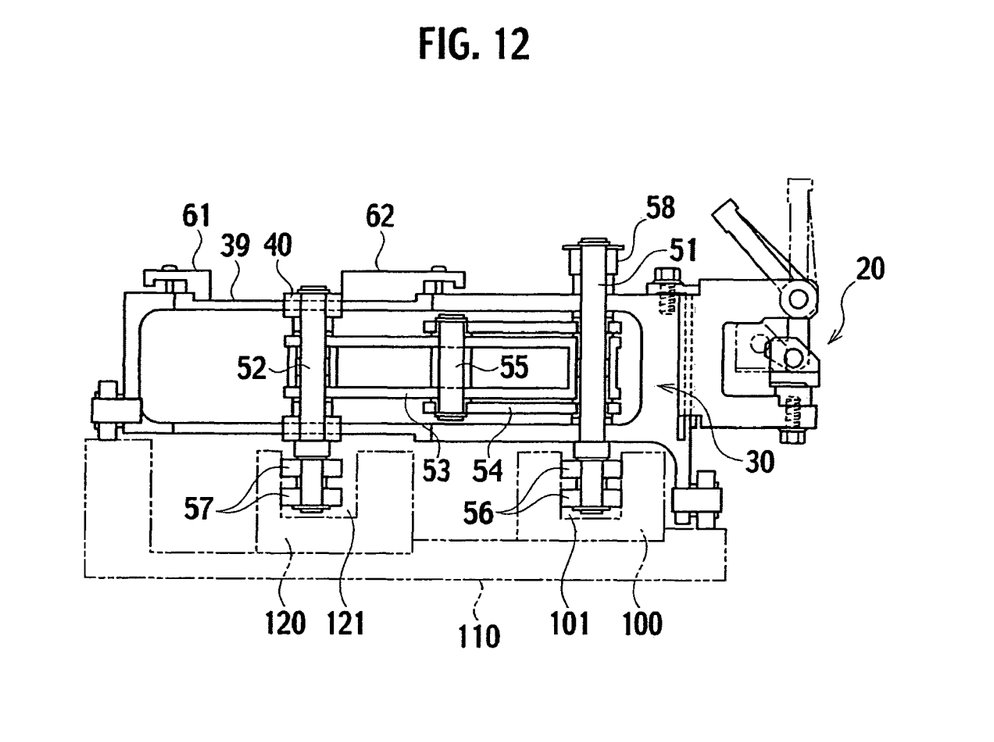
FIG. 12 is a side view of essential parts of the sheet or film clipping stretcher in a maximal pitch state (with stoppers on) according to the other embodiment of the present invention.

In other words, the stopper member 62 is movable between an abutment position illustrated in FIG. 12, where it is put in the stroke end part at the one end side (clip side) of the elongate hole 39 for a slider 40 to be brought into abutment therewith, and a retract position illustrated in FIG. 10, where it is retracted from the abutment position and free of abutments with the slider 40. Accordingly, under a condition in which stopper members 62 are put in retract positions and free of abutments with sliders 40, as illustrated in FIG. 10, neighboring clip support members 30 have a maximal pitch therebetween established, like the embodiment described, by sliders 40 arriving at stroke end parts at the clip sides of elongate holes 39. That is, this case gives a maximal value $D_M$(MAX) (refer to FIG. 11).

Figure 13:
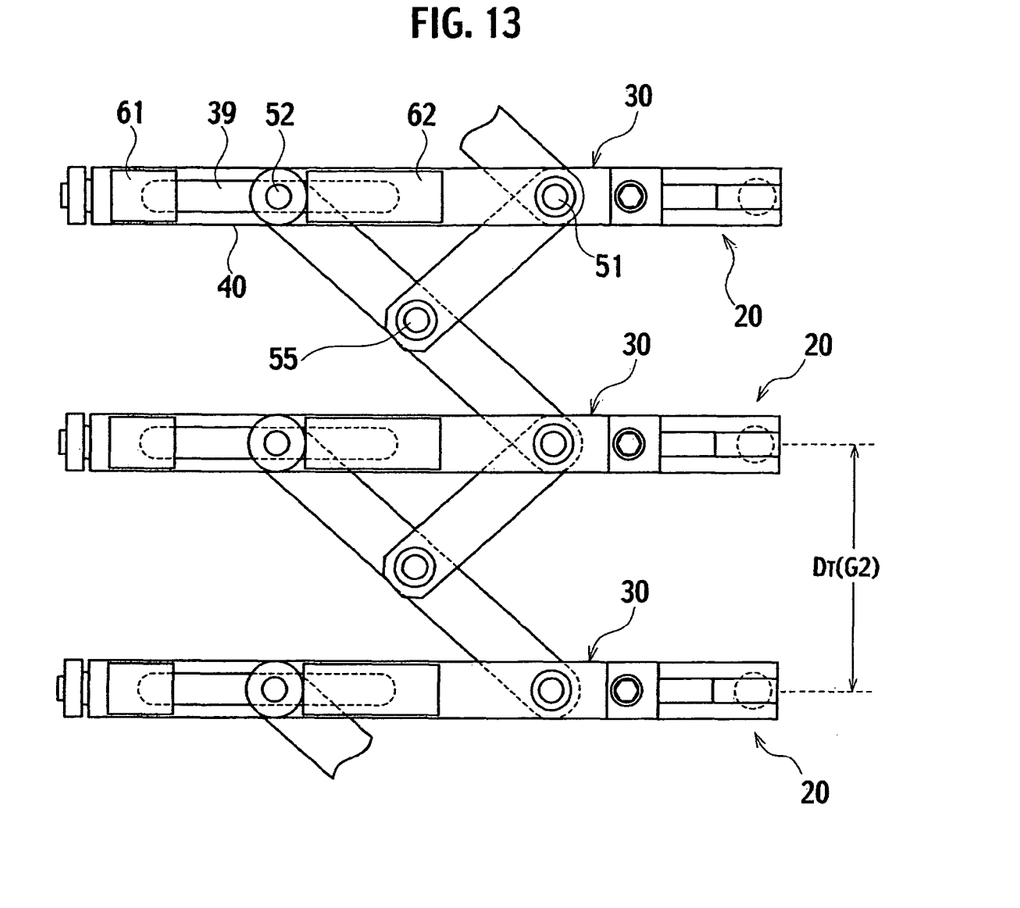
FIG. 13 is a plan view of essential parts of the sheet or film clipping stretcher in the maximal pitch state (with stoppers on) according to the other embodiment of the present invention.

On the other hand, as illustrated in FIG. 12, under a condition in which stopper members 62 are put in abutment positions for sliders 40 to be brought into abutments therewith, neighboring clip support members 30 have maximal pitches therebetween depending on positions of the sliders 40 in elongate holes 39 at the clip sides, to be individually established by a stopper member 62 for each clip support member 30. This enables, as illustrated in FIG. 13, maximal pitches between neighboring clip support members 30 to be set to a prescribed pitch $D_M$(G2).

INDUSTRIAL APPLICABILITY

As will be seen from the foregoing description, according to the present invention, in a sheet or film clipping stretcher, a clip is mounted on a clip support member, and one end of a main link member and one end of a sub-link member are pivotally connected to a first shaft member at the clip side of the clip support member, whereby a reference linkage is configured on the clip side, with a structure needing no chain links.

Accordingly, unlike those which have a clip mounted on one end of a main link member, it is implemented to prevent variations of angles of clips to sheet or film, and variations of positional intervals (as MD pitches of clips) in the longitudinal direction (as MD direction) of sheet or film, from getting large at flexural portions of guide rails where the width of transverse stretch changes, thus allowing for simultaneous biaxial stretch of high magnification to be performed with high precision.

Further, the provision of a reference linkage configured on the clip side serves, among others, to keep radii of flexural portions of reference rails from getting large, and prevent moments to be born to provide forces to stretch sheet or film in the flow direction (MD direction) from getting large.

Further, the structure being free of chain links permits the number of components to be reduced, and eliminates anxieties for occurrences of a back-fold of chain link just after stretch that might cause troubles in operation.

In addition, possible provision of a stopper mechanism permits clip MD pitches in a clipping of film or sheet to be set, allowing for the clip MD pitches to be set by stopper adjustments to a greater value than a minimal pitch between neighboring clips (linkage elements) contacting each other. Further, also a clip MD pitch at a maximal end is adjustable by stopper adjustment.

The invention claimed is:

1. A sheet or film clipping stretcher including first and second clip arrays composed of clips, respectively, and configured to clip both side edge parts of a sheet or film to stretch the sheet or film, the sheet or film clipping stretcher comprising first and second clip array circulators line-symmetrically arranged on a plane, and configured to circulate the first and second clip arrays along line-symmetric prescribed routes, respectively, the first and second clip array circulators each respectively comprising a plurality of clip support members rectangular in shape, and each respectively having a clip supported on one longitudinal end part thereof, and a longitudinal elongate hole formed therein at the other end side, a first shaft member provided in a vicinity of the one end part of a respective clip support member, a slider slidably engaged with the elongate hole of the respective clip support member, a second shaft member provided to the slider of the respective clip support member, a main link member having an end thereof pivotally connected to the first shaft member of the respective clip support member, and another end thereof pivotally connected to a second shaft member of a neighboring clip support member, a sub-link member having an end thereof pivotally connected to the first shaft member of the respective clip support member, and another end thereof pivotally connected by a pivot shaft to an intermediate part of a neighboring main link member, a reference rail engaged with an engaging element provided on the first shaft member of the respective clip support member, and defining a prescribed route, a pitch setting rail provided along with the reference rail, engaged with an engaging element provided on the second shaft member of the respective clip support member, and configured to set a pitch between neighboring clip support members in a variable manner depending on a spacing distance relative to the reference rail, and a drive sprocket configured to selectively engage with a driving roller provided on the first shaft member of the respective clip support member to have the respective clip support member travel along the prescribed route.

2. The sheet or film clipping stretcher according to claim 1, wherein the first and second clip array circulators each respectively comprises a stopper mechanism configured to set a movable range of the slider in the elongate hole of the respective clip support member.

3. The sheet or film clipping stretcher according to claim 2, wherein the stopper mechanism comprises a stopper member configured for the slider to be brought into abutment therewith in a stroke end part at one end or the other end of the elongate hole of the respective clip support member.

4. The sheet or film clipping stretcher according to claim 2, wherein the stopper mechanism is configured with a stopper member movable between an abutment position for the slider to be brought into abutment therewith in a stroke end part at one end or the other end of the elongate hole of the respective clip support member and a retract position for a retraction thereof from the abutment position to be free of abutments with the slider.

* * * * *